Jan. 10, 1967     B. SUMMERS     3,297,166
PORTABLE SKEWER RACK FOR BRAZIERS
Filed May 10, 1965
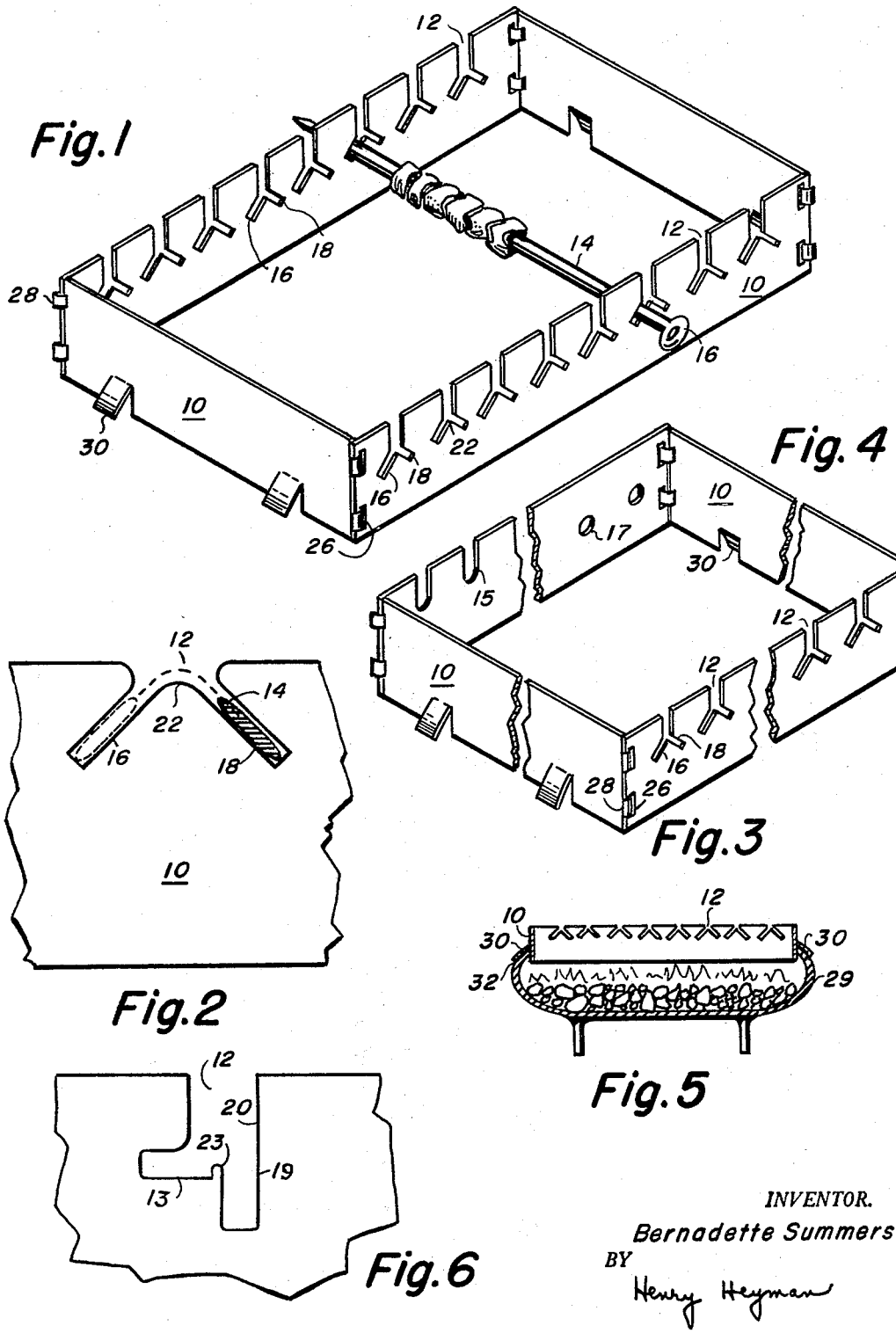
INVENTOR.
Bernadette Summers
BY
Henry Heyman United States Patent Office 3,297,166
Patented Jan. 10, 1967

3,297,166
PORTABLE SKEWER RACK FOR BRAZIERS
Bernadette Summers, 2122B 41st St.,
Los Alamos, N. Mex. 87544
Filed May 10, 1965, Ser. No. 454,256
8 Claims. (Cl. 211—60)

This invention relates to a portable simple skewer rack to be used with braziers, broilers, and the like whereby a plurality of skewers can be utilized simultaneously. The prior art such as Patents 3,126,814; 3,169,470; 2,885,950 and 1,862,077 teach some forms of multiple skewer racks, however there does not appear to be any teaching of a simple portable multiple skewer rack applicable to the popular cook-out type of brazier or habachi.

Primarily, the object of the invention resides in the provision of an economical, simple and convenient to use portable skewer rack so constructed that it can be rested on the grating, metallic grid or edge of any brazier of conventional type and which so supports a plurality of skewers that food such as Shish Kababs can be uniformly cooked on all sides.

It is another object of the present invention to provide a simple and foldable skewer rack which is convenient to use, store and to keep clean; while at the same time has certain novel skewer support slots which permit the food or kababs to be uniformly cooked.

Although the prevalent practice of "cook-outs" makes use of the charcoal brazier and even provides motor driven skewers for the same, no mechanism is presented to enable the cooking of Shish Kababs for example. If the food laden skewers are rested on the horizontal rack of the portable brazier, the food burns and sticks to the metal bars of the rack and thereby results in the loss of a considerable protion of the food being cooked. In addition it is impossible to so load the skewers with food that they can be rested in the necessary rotational positions required for cooking the food from all sides.

It is frequently the case in manipulating food being cooked on a "cook-out" to wear a cumberson protective mitten with the result that unless each skewer is reliably held in place, that one or more will be dislodged while "turning" a selected one.

It is therefore still a further object of the present invention to provide in a skewer support rack novel skewer support slots which will reliably hold the skewers in any one of four rotational positions.

It is still another objective of the present invention to provide skewer support slots which will reliably and permanently hold the skewers in any selected rotational position and prevent dislodgement of the same due to accidental forces being applied to same.

Still another objective of the present invention is to provide a simple, yet effective skewer rack which has no moving mechanism and which is therefore readily cleaned and is completely reliable in use.

Another object of the present invention is to provide a simple foldable skewer rack which is foldable into a flat elongated condition thereby rendering its storage extremely convenient.

The manner of accomplishing these objects together with other objects and the advantages inherent therein will become more apparent from the following description and the accompanying drawings.

In the drawings:

FIGURE 1 is an isometric showing of an embodiment of my novel skewer rack with a skewer supported thereon.

FIGURE 2 is an enlarged showing in elevation of a skewer support slot.

FIGURE 3 is an isometric view of a fragment of a second embodiment of the skewer rack.

FIGURE 4 is an isometric view of a portion of still another modification of the skewer rack.

FIGURE 5 is a cross-section elevational view of my novel skewer rack interlocked on the opposite upper edges of a brazier known as a hibachi.

FIGURE 6 shows an alternative form of skewer support slot.

Referring now more particularly to the drawings in which like numerals denote similar parts in the several views, the numeral 10 refers generally to the skewer rack. The skewer rack comprises two end and two side walls and is provided with a plurality of skewer receiving slots 12 in end walls in which skewers 14 can be received. The rack is provided with skewer supports evenly spaced on two opposite sides thereof. The length of slots 12 is exaggerated for purposes of clarity and may be much shorter and in fact have negligible depth.

An essential feature of a skewer is its flattened or elliptical cross-section so that food impaled thereon will be anchored rotationally. Thus food portions will remain in whatever position the skewer is given. As previously stated it has been found to be desirable to present four quadrants of the food to the heat of the fire in order to cook the food uniformly on all sides. It follows as a result of the flattened or elliptical cross-section of the skewer that two support receptacles or pockets at right angles to each other and of proper shape in the skewer support slot of the rack enables the skewer to be held firmly in the slot and to be rotated at will successively into the four quadrant positions.

There are a number of ways in which two support slots can be provided which have a 90° relationship to each other. The more apparent method is shown in FIGURE 6. Here one skewer pocket 18 is elongated in the vertical direction and the other pocket 13 has its direction of elongation at right angles to the pocket 19, which is horizontal. However, skewers resting in the horizontal pocket 13 are prone to be knocked out of position unless means are provided to resist accidental dislodgement. To this end, I provide vertical protuberance 23 at the junction of the two pockets over which the skewer must mount before it can be dislocated.

A pair of skewer recesses or pockets having their direction of elongation at opposite angles of 45° to the vertical results in a single and more convenient construction than that of FIGURE 6. This preferred construction is shown in FIGURES 1, 2, 3 and 4. Referring to FIGURES 1 and 2, it is seen that I provide vertical slots 12 which are of a width to readily accommodate the major width of a skewer. At the bottom of slot 12 which in the base of FIGURE 2, is of negligible length, I provide elongated pockets 16 and 18, each having a width slightly greater than the minor dimension of the cross-section of the skewer, i.e., the thickness and the direction of elongation having opposite angles of 45° to the vertical direction, i.e. direction of elongation of slot 12. It is apparent that this arrangement of pockets 16 and 18 permits the ready turning of the skewer and the reliable securing thereof in each of four 90° positions. In addition, it is virtually impossible to accidentally dislodge a skewer from a given position, yet it is exceedingly easy and convenient to deliberately reset or turn the skewer from one position to another even with a mittened hand. This operation is facilitated by my provision of arcuate surface 22 between the two pockets.

FIGURE 1 shows the vertical sewer receiving slots 12 and skewer pockets 16, 18 provided on two opposite sides of the skewer rack. While there may be conditions, such as in very large racks where the dual rows of pockets is desirable, I have found that it is possible to provide the skewer interlocking pockets on only one side of the rack. Referring to FIGURES 3 and 4, I show two alternative arrangements. FIGURE 3 shows simple skewer receiving supports 15 on the side of the rack opposite the interlocking pockets 16 and 18. FIGURE 4 shows skewer receiving holes or sockets 17 for supporting and retaining the end of the skewer remote from the handle end. Either of the skewer rotatably receiving seats 15 or 17 of FIGURES 3 and 4 have the advantage of simiplicity and more convenient use than the dual pocket system of FIGURE 1. However, I prefer to use the open slot version of FIGURE 3 because it avoids the necessity of tilting the skewers and the annoyance in some cases of food sliding off the skewers and becoming wasted. The depth of the rotational support 15 or 17 is coordinated with the depth of the locking pockets 16 and 18.

The walls of the skewer rack are hinged together at each pair of adjacent ends. Any well known type of hinge may be used although for the purpose of economy I prefer to provide one of each pair of adjacent ends with vertical slots 26 and to provide the other of the pair of ends with arcuate hinge tangs 28. Regardless of the type of hinge, the only requirement is that the hinges be oriented to rotate in the direction necessary to permit the rack to fold flat.

The skewer support rack of this invention is conveniently supported on any barbecue grill or grate. If a grate is not provided the skewer rack may rest on an open basin type charcoal brazier such as the habachi 29 of FIGURE 5. Means are provided for securedly affixing at least two opposite rack ends on walls on the brazier. To this end I provide laterally depending tangs 30 on the side walls of the skewer rack so that the rim 32 of the brazier is received in the receptacles provided between opposed surfaces of tangs 30 and walls 10.

The skewer rack of the persent invention may be readily scoured and folded for storage in a relatively small space. Obviously the article may be made in various sizes so that its use is applicable to larger broiling devices than the portable type brazier herein described.

While the present disclosure refers to certain embodiments of the invention, it is to be understood that various changes may be made in minor details of construction without departing from the spirit of the invention as defined in the appended claim.

I claim:

1. A portable multi-support skewer rack comprising two elongated sheet metal end walls and two sheet metal elongated side walls, said end walls being provided with similarly positioned vertical skewer receiving slots extending from the upper edge thereof, the skewer slots in at least one of said end walls each having a pair of skewer confining elongated pockets with the direction of elongation of each of the pair of elongated pockets being at an angle of 90° to the other, said elongated pockets having a length of elongation equal substantially to the major cross-sectional dimension of a flattened type skewer, and the width of said pockets being a clearance fit with the cross-sectional thickness of a skewer.

2. The portable skewer rack of claim 1 in which the two skewer confining pockets of each pair have their direction of elongation at opopsite angles of 45° to the median line of the receiving slot.

3. The portable skewer rack of claim 1 in which one of the pockets of each pair is positioned with its direction of elongation in line with the vertical direction of the receiving slot, and the other pocket of the said each pair is horizontal, a vertical protuberance in the floor of the horizontal pocket at the junction of the horizontal and vertical pocket.

4. The portable skewer rack of claim 1 in which the lower end of the horizontal pocket nearest the rack vertical skewer receiving slot terminates at a vertical protuberance of the rack lateral wall, and the edge of the rack lateral wall defining the horizontal pocket upper edge is relieved to provide a clearance between the wall so relieved and the protuberance equal at least to the thickness of a skewer.

5. The portable skewer rack of claim 1 in which the adjacent ends of the walls of the rack are hinged, whereby said rack may be folded flat or opened to a rectangular configuration.

6. The portable skewer rack of claim 1 in which outwardly depending tangs are struck in the lower portion of each of the end walls to provide with the adjacent portions of the end walls, receptacles for encompassing the upper rim of a brazier.

7. A skewer rack comprising four metal walls in an open top and bottom box configuration, vertical slots opening at the upper edges of two opposite walls, a depending recess at the bottom of each such slot, said recess having a horizontal width equal to slightly more than the narrowest dimension of a flattened skewer, and a height equal to the major cross-sectional dimension of said skewer, a lateral recess in the wall opening into said depending slot, a vertical stop at the bottom edge of the lateral recess at the entrance to the depending vertical slot, and the wall material at the corner of the upper edge of the lateral recess and the vertical slot being relieved arcuately to provide clearance for the narrowest dimension of a flattened skewer to pass therethrough with slight clearance.

8. A skewer rack comprising two elongated end walls and two elongated side walls, the ends of said walls being hingedly joined together, a plurality of skewer supporting receptacles similarly spaced along the two end walls and open along corresponding edges thereof, said receptacles along one of said two end walls each having two elongated skewer receiving pockets with the directional of elongation thereof being at right angles to each other and the direction of elongation of each pocket being at a downward angle of 45 degrees to the direction of elongation of the wall, the adjacent sides of the two elongated securing pockets being joined with arcuate connecting means, the skewer receiving receptacles in the other of the said two end walls each having an arcuate bottom adapted to rotatably support an end portion of a skewer.

References Cited by the Examiner

UNITED STATES PATENTS

| | | | |
|---|---|---|---|
| D. 183,005 | 6/1958 | Krause | 99—419 X |
| 1,888,616 | 11/1932 | Bocchino | 99—421 |
| 2,633,318 | 3/1953 | Caples | 248—125 |
| 3,169,470 | 2/1965 | Oatley | 99—421 |

CLAUDE A. LE ROY, *Primary Examiner.*

W. D. LOULAN, *Assistant Examiner.*